United States Patent [19]

Natzke et al.

[11] Patent Number: 4,478,307

[45] Date of Patent: Oct. 23, 1984

[54] CONTROL HANDLE LOCKUP

[75] Inventors: Ronald C. Natzke; Maurice Klee, both of Burlington, Iowa

[73] Assignee: J. I. Case Company, Racine, Wis.

[21] Appl. No.: 308,371

[22] Filed: Oct. 5, 1981

[51] Int. Cl.³ .................... B60K 26/00; G05G 5/06; G05G 11/00
[52] U.S. Cl. .................................................. 180/273
[58] Field of Search ............... 180/273, 272, 271, 287

[56] References Cited

U.S. PATENT DOCUMENTS

| | | | |
|---|---|---|---|
| 1,409,202 | 3/1922 | Sabattier | 180/273 |
| 2,672,203 | 3/1954 | Brown | 180/273 |
| 2,911,053 | 11/1959 | Ayers et al. | 180/273 |
| 3,265,150 | 8/1966 | Westman | 180/273 |
| 3,700,062 | 10/1972 | Garnett | 180/273 |
| 3,927,776 | 12/1975 | Steiger | 180/273 |
| 4,221,277 | 9/1980 | Mastropieri | 180/273 |
| 4,365,687 | 12/1982 | Bauer | 180/273 X |
| 4,392,543 | 7/1983 | Buckhouse et al. | 180/273 X |
| 4,392,544 | 7/1983 | Dilno | 180/273 |
| 4,398,618 | 8/1983 | Houssen | 180/273 |

FOREIGN PATENT DOCUMENTS 12382 8/1900 United Kingdom ............... 180/273

Primary Examiner—Joseph F. Peters, Jr.
Attorney, Agent, or Firm—Dressler, Goldsmith, Shore, Sutker & Milnamow, Ltd.

[57] ABSTRACT

A locking arrangement to arrange a control lever of a vehicle in a neutral position. The locking arrangement is activated and inactivated in response to the presence of an operator in the seat of the vehicle. The locking arrangement retains the control lever in a neutral position when the operator is not in the seat.

14 Claims, 6 Drawing Figures

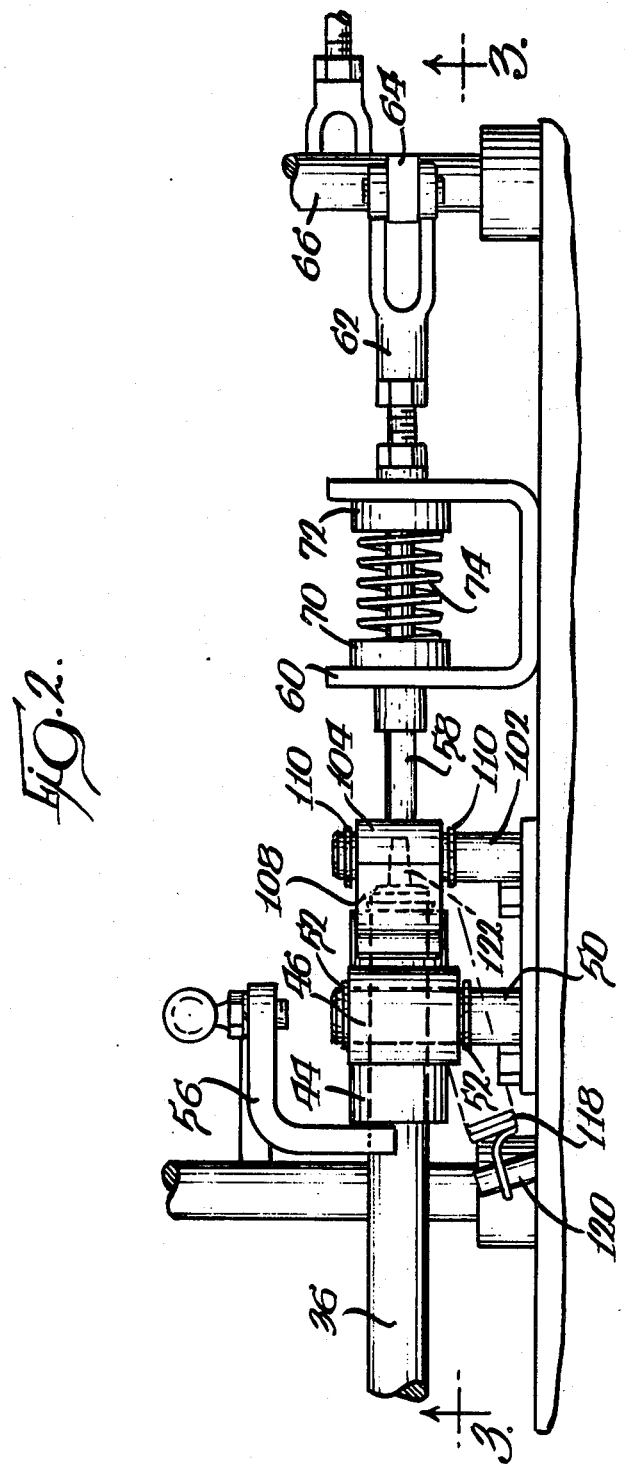

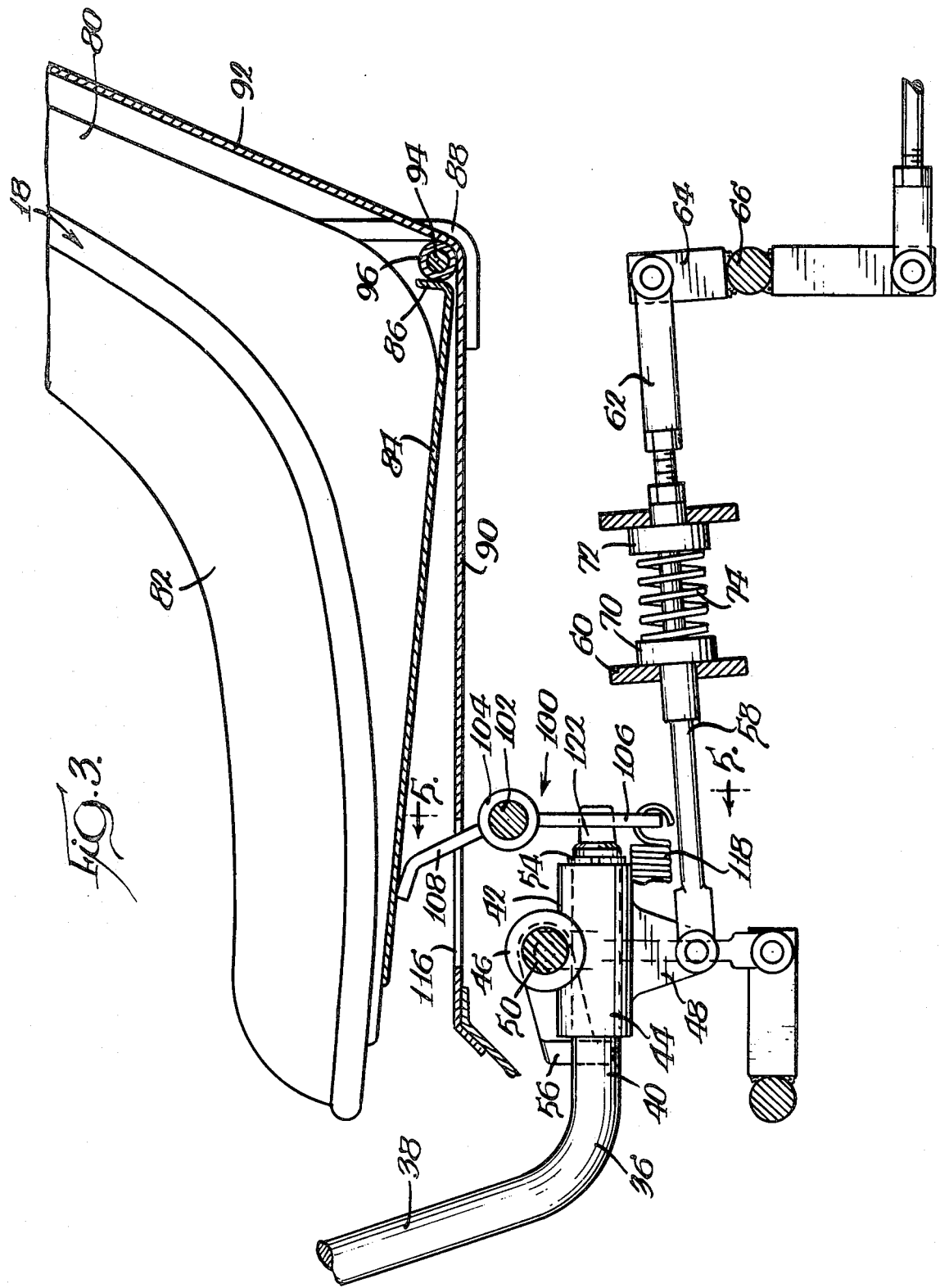

CONTROL HANDLE LOCKUP

BACKGROUND OF THE INVENTION

Numerous vehicles of the track or wheel type to perform various material handling operations have been proposed. One type of vehicle that has received a considerable degree of attention is a small unit that incorporates four wheels which are driven by two separate power sources and the steering or turning movement is accomplished by driving the pair of wheels on one side of the vehicle in one direction while the second pair of wheels is either in a neutral condition or driven in the opposite direction. These vehicles have generally been referred to as skid steer vehicles.

One type of skid steer vehicle that is presently commercially available incorporates hydraulically actuated fluid translating devices as the power train between the engine and the respective pair of wheels. In order to simplify the construction and reduce the cost of vehicles of this type, the actuation of the fluid translating devices is controlled through manual control levers that respectively cooperate with the two translating devices on opposite sides of the vehicle and the fluid translating devices are maintained in engagement by manual forces applied to the control levers. The control levers may additionally function to control the movement of the lift arms and the material handling attachment. For safety reasons, the control systems are designed to automatically return to a neutral position upon release of the control levers.

SUMMARY OF THE INVENTION

The present invention is directed to a unique locking arrangement to retain the control levers in their neutral position when the vehicle is not intended to be operative. In particular, the locking arrangement is activated and inactivated in response to the presence of an operator in the operator's seat of the vehicle. The control levers are locked in their neutral position until such time as an operator occupies the vehicle seat. This prevents the operation of the vehicle without an operator in the vehicle seat.

According to the present invention, the locking arrangement includes a locking member movable between a first position in locking engagement with the control lever when it is in its neutral position and a second position in disengagement with the control lever. The locking member is biased towards its first position and is automatically moved to its second position when an operator is seated in the vehicle seat.

More specifically, the locking member is pivotally mounted to the vehicle body about a substantially horizontal axis. The locking member includes a locking flange having an opening therethrough for locking engagement with an end portion of the control lever. The vehicle seat is also pivotally mounted to the vehicle body about a substantially horizontal axis. The seat has an up position when it is not occupied and a down position when it is occupied. The locking member has a control flange in contact with the underside of the seat such that movement of the seat between its up and down positions is translated to pivotal movement of the locking member between its locked and unlocked positions. A spring means is provided to bias the locking member towards its locked position and the seat towards its up position. The operator's weight when seated in the seat is effective to move the seat to its down position and the locking member to its unlocked position. The control lever has a stub portion at its end which is in the shape of a truncated pyramid which is received in a rectangular opening in the locking flange when the locking member is in its locked position and the control lever is in its neutral position.

BRIEF DESCRIPTION OF THE SEVERAL VIEWS OF THE DRAWINGS

FIG. 2 is a plan view showing the locking arrangment in combination with a portion of the operating linkages which are controlled by the control lever;

FIG. 3 is an elevational view, partially in section, showing the locking arrangement and operating linkages as in FIG. 2 in relation to the vehicle seat with the control lever in its locked position;

DETAILED DESCRIPTION

Figure 1:
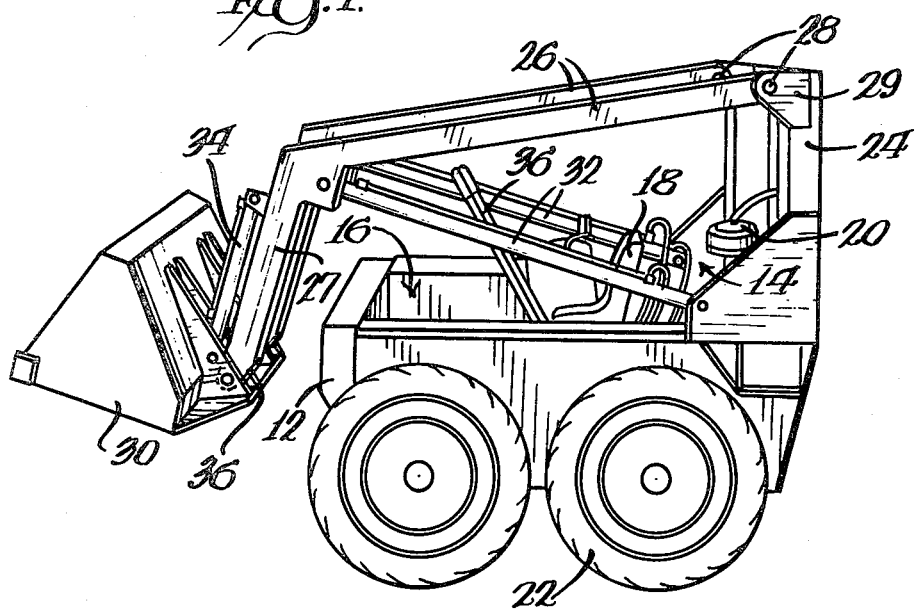
FIG. 1 is a perspective view of a vehicle of the type which incorporates the locking arrangement of the present invention therein.

While this invention is susceptible of embodiment of many different forms, there is shown in the drawings and will herein be described in detail one specific embodiment, with the understanding that the present disclosure is to be considered as an exemplification of the principles of the invention to the embodiment illustrated.

FIG. 1 of the drawings shows a tractor vehicle, generally designated by the reference numeral 10. Tractor vehicle 10 consists of a frame structure including body 12 defining engine space 14 at the rear end thereof and forward space 16 for the operator's legs at the forward end thereof. Seat 18 is located intermediate the engine space and the forward space and extends above body 12. Engine 20 is located in engine space 14 at the rear end of body 12, while body 12 is supported on first and second pairs of ground engaging members or wheels 22 rotatably supported on body 12 by stub shafts. One pair of wheels is located on each side of body 12.

Tractor vehicle 10 further includes first and second stanchions 24 extending above body 12 adjacent the rear end thereof on opposite sides of engine space 14. A lift arm 26 is pivotally mounted by pivot pin 28 adjacent the upper end of each stanchion 24. Pin 28 is supported on forwardly extending brackets 29 (only one being shown).

Lift arms 26 extend forwardly along opposite sides of spaces 14 and 16 as well as seat 18 and have front portions 27 directed downwardly adjacent the front end of body 12. Material handling member 30, illustrated as a bucket, is pivotally connected to the front portions 27. Material handling member 30 may take a variety of forms such as a dozer blade, scoop, fork lift, etc.

Hydraulic fluid rams 32 are positioned between each stanchion 24 and its associated lift arm 26 so that the lift arms 26 may be raised and lowered on the vehicle body 12. Also, hydraulic fluid rams 34 are located between the material handling member 30 and the front portions 27 of the lift arms 26 to pivot the material handling member 30 relative to the lift arms 26.

Each pair of wheels 22 on the respective sides of the vehicle is driven through separate power trains which are of identical construction. Each power train is controlled by a separate control lever 36. Each control lever 36, in addition to controlling the power train associated therewith, may perform a second function of either controlling the movement of lift arms 26 through rams 32 or the movement of member 30 through rams 34. The detailed disclosure of the specific linkages associated with the operation of the control levers is not deemed to be necessary for a full understanding of the invention, and, in fact, would tend to obscure the disclosure of the invention. Accordingly, only portions of such linkages are shown in the drawing and described in the disclosure which hereinbelow follows. Suffice it to say, each control lever 36 is pivotal about a transverse horizontal axis to control the power train which drives the wheels and about a longitudinal horizontal axis to control either the movement of the lift arms or the material handling member. Such control lever and linkage assemblies are well known in the art.

Figure 4:
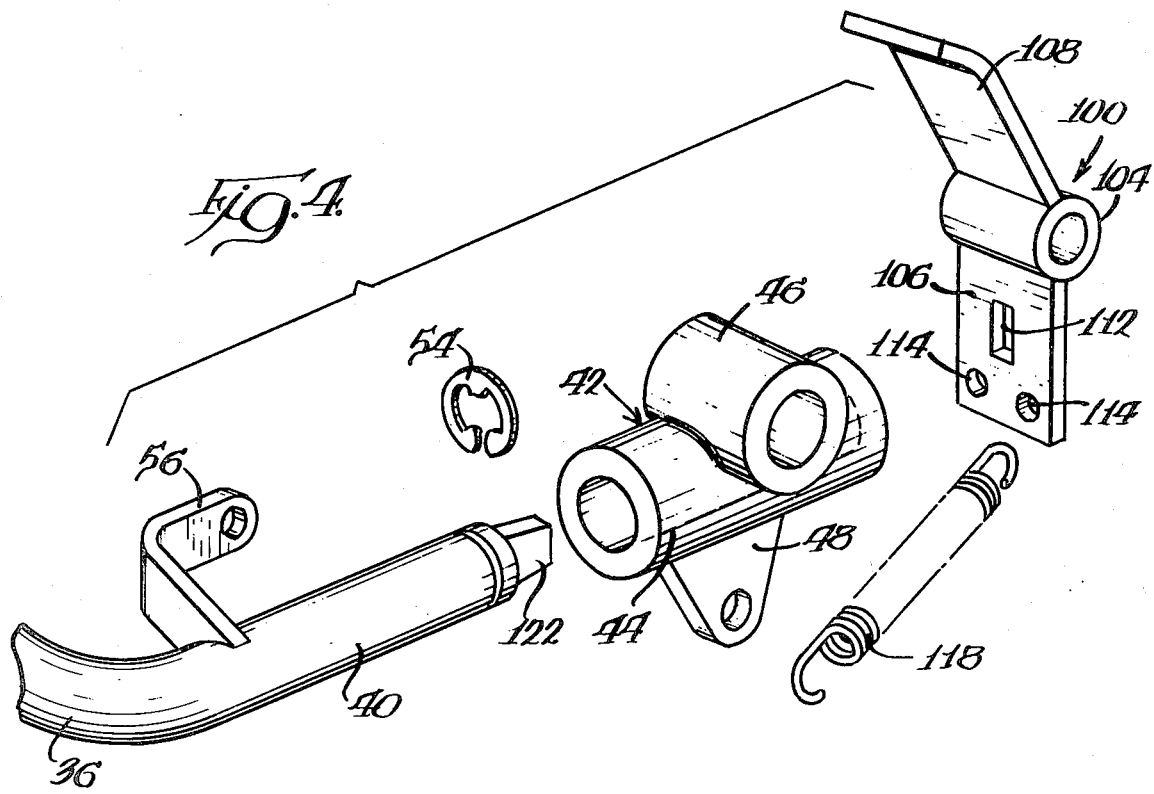
FIG. 4 is an enlarged exploded perspective view of the various parts of the locking arrangement.
Figure 5:
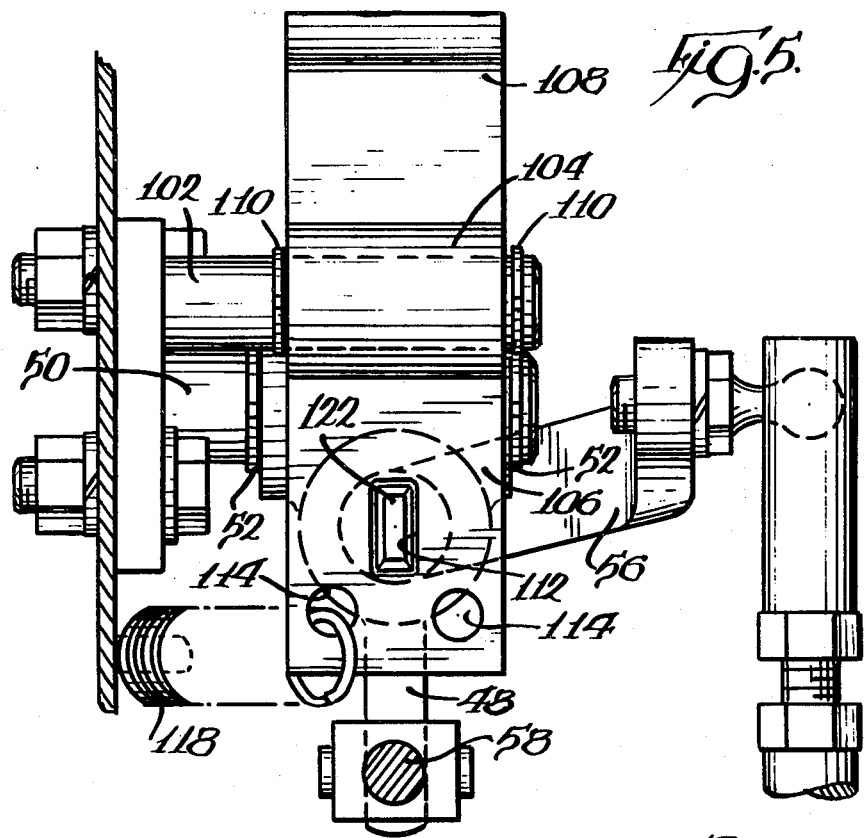
FIG. 5 is an end view of the locking arrangement and operating linkages as shown in FIG. 2.

The control lever locking arrangement of the present invention will now be described in detail in association with the left side control lever, it being understood that the locking arrangement associated with the right side control lever is identical. Referring to FIGS. 2-6, and in particular to FIG. 3, control lever 36 has an upwardly and forwardly extending section 38, the upper end (not shown) of which is controlled by the operator, and a substantially horizontal rearwardly extending section 40 which is received through member 42. As best seen in FIG. 4, member 42 has a longitudinally extending boss portion 44, a transversely extending boss portion 46 and a longitudinally extending flange portion 48. Member 42 is secured to the frame of the vehicle thorugh a stub shft 50, rigidly secured to the vehicle frame, which extends through boss portion 46 and is secured in place by ring retainers 52, as best seen in FIG. 5. Member 42 pivots about the transverse horizontal axis of shaft 50. Section 40 of control lever 36 extends through boss portion 44 and is secured in place by a ring retainer 54 at one end and an angle bracket 56 secured to control lever 36 at the other end, as best seen in FIG. 3. Control lever 36 is rotational about the longitudinal horizontal axis passing through boss portion 44. It can therefore be seen that control lever 36 is pivotable in a forward and backward direction and rotational in a side to side direction. The forward and backward movement of control lever 46, in cooperation with appropriate linkages, controls the power train which drives a pair of wheels 22. The side to side rotational movement of control lever 36, in cooperation with appropriate linkages, controls either the movement of lift arms 26 or member 30.

Referring to FIGS. 2 and 3, a portion of the linkage which controls the power train associated with one of the pair of wheels 22 is shown for purpose of describing the means to bias the control lever 36 into its neutral position. A link member 58 is pivotally secured at one end to flange 48 through a clevis and pin arrangement and extends through a spring retainer member 60 and is secured to a link and clevis member 62, which in turn is attached to a flange 64 welded to a transverse shaft 66. Positioned within member 60 are a pair of spring retainer cups 70 and 72. Cup 70 is suitably secured to a forward portion of link member 58 and is movable therewith towards cup 72 and cup 72 is suitably secured to a rearward portion of member 58 and is movable therewith towards cup 70. A spring member 74 extends between cups 70 and 72. Link member 58 passes through cups 70 and 72 and spring 74. Spring member 74 is effective to bias control rod 58 and in turn member 40 such that the control lever 36 automatically returns to its neutral position upon release of the control lever by the operator.

As seen in FIG. 3, seat 18 is formed about a sheet metal pan 80 and includes a foam cushion insert 82. The bottom section of pan 80 is secured to a sheet metal plate 84 which has an upturned end 86. A seat support frame 88 is rigidly secured to the vehicle body and includes a substantially horizontal bottom portion 90 and an upwardly and rearwardly extending back portion 92. Plate 84 is pivotally secured to frame 88 about a short pivot pin 94 extending inwardly from each side of the vehicle. Each pivot pin 94 receives three sleeves 96 (only one of which is shown), the two outer sleeves being welded to frame 88 and the middle sleeve being welded to upturned end 86 of plate 84. Accordingly, seat 18 is pivotable about the transverse horizontal axis passing through pins 94.

Figure 6:
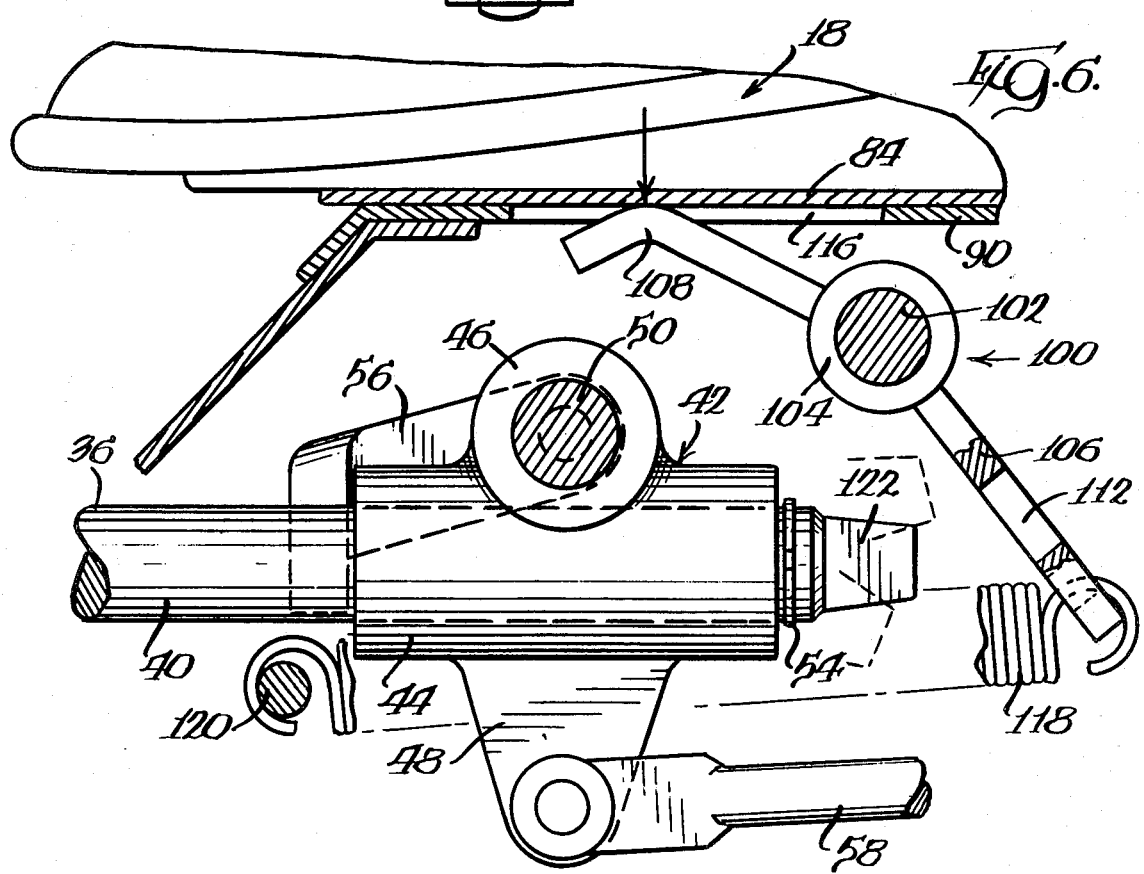
FIG. 6 is an enlarged view of a portion of the locking arrangent as shown in FIG. 3 with the control lever in its unlocked position.

Referring to FIGS. 3 and 6, a locking member 100 is pivotally secured about a stub shaft 102 which extends inwardly from the vehicle side frame. Locking member 100 includes a cylindrical boss portion 104, through which shaft 102 passes, a locking flange 106 and a control flange 108, which are welded to and extend substantially radially outwardly from boss portion 104. Boss portion 104 is positioned in place about shaft 102 by retaining rings 110, as seen in FIG. 5. Locking flange 106 is formed from a rectangular plate having a centrally disposed rectangular opening 112 passing therethrough. A pair of circular openings 114 are provided through flange 106 adjacent its lower corners. Control flange 108 is formed from a rectangular plate which is curved downwardly at its outer end. Flanges 106 and 108 extend outwardly from boss 104 so as to define an included angle of approximately one hundred and fifty degrees. Locking member 100 is positioned in spaced relationship to seat 18 and the end of control lever 36 such that when flange 106 is in a vertical position, in opposing relationship to the end of control lever 36, the control flange 108 passes through an opening 116 in bottom portion 90 of frame 88 and the curved outer end thereof contacts the underside of plate 84 so as to pivot the front end of seat 18 to an up position. The significance of this space relationship will become more apparent in the description of the operation of the invention. A spring member 118 is provided to bias locking member 100 into a locked position in which locking member 106 is in a vertical position, as shown in FIG. 3. Spring member 118 at one end passes through an opening 114 in locking member 106 and at its other end is received around a stud member 120 secured to the vehicle side frame.

The inner end of control lever 36 has a stub portion 122 formed integrally therewith. Stub portion 122 is preferably shaped in the form of a truncated pyramid to facilitate its receipt through opening 112.

A brief description of the operation of the locking arrangement which hereinbelow follows will further define the space relationships of the various elements. Referring to FIG. 3, locking member 100 is biased into its locked or first position by spring 118. The control lever 36 is biased into its neutral position by spring 74.

With the member 100 in its first position and the control lever in its neutral position, stub portion 122 is received through opening 112. The positioning of stub portion 122 through opening 112 prevents the movement of control lever 36 about the longitudinal horizontal axis passing through boss portion 44 and the transverse horizontal axis passing through boss portion 46. Accordingly, control lever 36 is inoperative to activate the linkages which control the movement of corresponding wheels 22 or the lift arms 26 or the bucket 30 associated with that control lever. It should be noted that the curved end portion of control flange 108 is in contact with plate 84 through opening 116 and supports seat 18 in its up position.

At such time as the vehicle 10 is to be put into service, the weight of the operator positioned in seat 18 is effective to pivot seat 18 about the horizontal axis passing through pins 94 into its down position, as shown in FIG. 6. The movement of seat 18 from its up position to its down position is effective to pivot locking member 100 in a counterclockwise direction about shaft 102, into its unlocked or second position, as indicated by the arrow in FIG. 3, against the bias of spring 118. As best seen in FIG. 6, when seat 18 is in its down position and locking member 100 is in its second position, the locking flange 106 is moved rearwardly such that stub portion 122 is no longer positioned within opening 112. As long as the operator remains in seat 18 the locking member 100 continues to assume its second position out of locking engagement with stub portion 122. The control lever 36 is now free to be rotated about the horizontal axis passing through boss portions 44 and 46 to activate the associated linkages to control the movement of vehicle 10 and either the lift arms 26 or the bucket 30 associated with that control lever.

At such time as the operator releases the control lever 36, spring 74 returns control lever 36 to its neutral position and when the operator evacuates the seat 18, spring 118 returns locking member 100 to its first position, which is effective to raise the front end of seat 18 to its up position and stub portion 122 is received through opening 112. Accordingly, the control lever is locked in its neutral or inoperative position.

As can be seen from the above description, the locking arrangment of the present invention provides a simple and inexpensive mechanical means to automatically lock the control lever of a vehicle in a neutral position whenever the vehicle seat is not occupied by an operator. The present invention additionally serves to require that the operator remain seated in the seat while operating the vehicle.

What is claimed is:

1. A control lever and lockup arrangement for a vehicle having a vehicle body, and seat means positioned on said body for receiving an operator, comprising:

control lever means mounted on said body for a biaxial movement about first and second generally perpendicular axes, said lever means being movable about said first axis from a neutral position to an operative position, and movable about said second axis from said neutral position to another operative position; and lever lockup means operatively associated with said seat means movably mounted on said vehicle body for movement from a first position to a second position attendant to the operator being seated in said seat means, said lockup means being operatively associated with said control lever means whereby in said second position of said lockup means said lever means is retained from moving from said neutral position into either of said operative positions.

2. The invention as defined in claim 1, wherein said lockup means comprises a locking member pivotally mounted on said vehicle body, said member including means reactive with said seat means for pivotal movement of said locking member from said first position to said second position, said locking member further including means for receiving said control lever means when said lever means is in said neutral position and said locking member is in said second position for retaining said lever means against movement from said neutral position.

3. The invention as defined in claim 2, wherein said lockup means comprises means for biasing said locking member from said first position toward said second position.

4. In a vehicle having a vehicle body, and seat means positioned in said body for receipt of an operator, a control lever and lockup arrangement comprising: a movable control lever means for controlling said vehicle, said control lever means having a neutral position and an operative position, and a locking means associated with said control lever means for automatically retaining said control lever means in said neutral position when an operator is not seated on said seat means and permitting said control lever means to move to said operative position when an operator is seated on said seat means, said locking means including a locking member mounted for pivotal movement on said vehicle body about an axis, said locking member including means reactive with said seat means and movable about said axis for automatically pivoting said locking member when the operator is seated in said seat means from a first to a second position, said locking member further including means movable about said axis for receiving said control lever means so that said locking member retains said lever means in said neutral position when said locking member is in said second position.

5. The invention as defined in claim 4 including means for biasing said control lever means towards said neutral position.

6. The invention as defined in claim 5 wherein said locking means includes means for biasing said locking member toward said first position.

7. The invention as defined in claim 6 wherein said locking member is pivotally mounted to said vehicle body for movement about said axis which is substantially horizontal, said receiving means comprising a locking flange for engagement of said control lever means and said reactive means comprising a control flange for translating movement associated with an operator seated in said seat means so as to pivot said locking flange about said substantially horizontal axis out of engagement with said control lever means.

8. The invention as defined in claim 7 wherein spring means is secured between said locking member and said vehicle body so as to bias said locking member towards said first position.

9. In a vehicle having a vehicle body, and seat means positioned in said body for receipt of an operator, a control lever and lockup arrangement, comprising: a movable control lever means for controlling said vehicle, said control lever means having a neutral position and an operative position, means for biasing said control lever means towards said neutral position, and a locking means associated with said control lever means for automatically retaining said control lever means in said neutral position when an operator is not seated on said seat means and permitting said control lever means to move to said operative position when an operator is seated on said seat means;

said locking means including a locking member movable between a first position in locking engagement with said control lever means when said control lever means is in said neutral position and a second position in disengagement with said control lever means, and means for biasing said locking member toward said first position;

said arrangement including means associated with said seat means wherein said locking member is automatically moved from said first position to said second position when an operator is seated in said seat means, said locking member being pivotally mounted to said vehicle body about a substantially horizontal axis, said locking member having a locking flange for engagement of said control lever means and a control flange for translating movement associated with an operator seated in said seat means so as to pivot said locking flange about said substantially horizontal axis out of engagement with said control lever means, said seat means being pivotally mounted to said vehicle body about a substantially horizontal axis, said control flange being in contact with said seat means such that when said locking member is in said first position said control flange pivots a portion of said seat means to an up position, and an operator seated in said seat means pivots said portion of said seat means to a down position and said locking member to said second position.

10. The invention as defined in claim 9 wherein said control lever means has a stub portion associated therewith and said locking flange has an opening therethrough for receipt and retention of said stub portion.

11. The invention as defined in claim 10 wherein said opening in said locking flange is rectangular and said stub portion is shaped in the form of a truncated pyramid.

12. In a vehicle having a body, and seat means positioned in said body for receipt of an operator, a control lever and lockup arrangement, comprising: a movable control lever means for controlling said vehicle, said control lever means having a neutral position and an operative position, means for biasing said control lever means towards said neutral position, and a locking means associated with said control lever means for automatically retaining said control lever means in said neutral position when an operator is not seated on said seat means and permitting said control lever means to move to said operative position when an operator is seated on said seat means;

said locking means including a locking member movable between a first position in locking engagement with said control lever means when said control lever means is in said neutral position and a second position in disengagement with said control lever means, and means for biasing said locking member toward said first position;

said arrangement including means associated with said seat means wherein said locking member is automatically moved from said first position to said second position when an operator is seated in said seat means, said locking member being pivotally mounted to said vehicle body about a substantially horizontal axis, said locking member having a locking flange for engagement of said control lever means and a control flange for translating movement associated with an operator seated in said seat means so as to pivot said locking flange about said substantially horizontal axis out of engagement with said control lever means, wherein said locking member includes a boss portion about which said locking member pivots, said locking flange being rigidly secured to said boss portion and extending downwardly therefrom, and said control flange being rigidly secured to said boss portion and extending upwardly therefrom.

13. The invention as defined in claim 12 wherein said control flange has an outer forwardly curved portion which contacts the underside of said seat means.

14. The invention as defined in claim 13 wherein the included angle between said locking flange and said control flange is approximately one hundred and fifty degrees.

* * * * *

UNITED STATES PATENT AND TRADEMARK OFFICE
CERTIFICATE OF CORRECTION

PATENT NO.  : 4,478,307
DATED       : October 23, 1984
INVENTOR(S) : Ronald C. Natzke & Maurice Klee It is certified that error appears in the above-identified patent and that said Letters Patent is hereby corrected as shown below:

In the Abstract, line 1, "arrange" should be --retain--.

In column 3, line 38, "shft" should be --shaft--.

Signed and Sealed this

Sixth Day of August 1985

[SEAL]

Attest:

DONALD J. QUIGG

Attesting Officer

Acting Commissioner of Patents and Trademarks